United States Patent
Somani et al.

(10) Patent No.: US 9,608,999 B2
(45) Date of Patent: Mar. 28, 2017

(54) SMART BEACON DATA SECURITY

(71) Applicant: Accenture Global Services Limited, Dublin (IE)

(72) Inventors: Avishek Somani, Toronto (CA); Sunil Raina, Issaquah, WA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 17 days.

(21) Appl. No.: 14/557,551

(22) Filed: Dec. 2, 2014

(65) Prior Publication Data

US 2016/0156638 A1     Jun. 2, 2016

(51) Int. Cl.
| | |
|---|---|
| *H04L 29/06* | (2006.01) |
| *H04L 29/08* | (2006.01) |
| *H04W 4/02* | (2009.01) |
| *H04W 12/12* | (2009.01) |
| *G01S 1/68* | (2006.01) |
| *G06Q 30/02* | (2012.01) |
| *H04W 4/00* | (2009.01) |
| *H04W 12/08* | (2009.01) |

(52) U.S. Cl.
CPC ............. *H04L 63/12* (2013.01); *H04L 63/08* (2013.01); *H04L 67/10* (2013.01); *H04L 67/12* (2013.01); *H04W 4/02* (2013.01); *H04W 12/12* (2013.01); *G01S 1/68* (2013.01); *G06Q 30/0261* (2013.01); *H04L 67/18* (2013.01); *H04W 4/005* (2013.01); *H04W 4/008* (2013.01); *H04W 12/08* (2013.01)

(58) Field of Classification Search
CPC ..... H04L 63/062; H04L 67/10; H04L 67/141; H04L 69/321; H04L 63/08; H04W 4/005; H04W 12/04; H04W 76/02
See application file for complete search history.

(56) References Cited

U.S. PATENT DOCUMENTS

| | | |
|---|---|---|
| 5,485,347 A | 1/1996 | Miura |
| 7,255,264 B2 | 8/2007 | De Leon |
| 7,567,920 B2 | 7/2009 | Hammad et al. |
| 7,731,086 B2 | 6/2010 | Sauders et al. |
| 8,326,221 B2 | 12/2012 | Dorsey |
| 8,369,842 B2 * | 2/2013 | Proctor, Jr. ........ G06Q 30/0623 455/414.3 |

(Continued)

FOREIGN PATENT DOCUMENTS

| | | |
|---|---|---|
| CN | 104392501 | 3/2015 |
| CN | 105243689 | 1/2016 |

(Continued)

OTHER PUBLICATIONS

"The Partial European search report", European Patent Application No. 15182143.6, European Patent Office, dated Jan. 21, 2016, 7 pages.

(Continued)

*Primary Examiner* — Mohammad A Siddiqi
(74) *Attorney, Agent, or Firm* — Mannava & Kang, P.C.

(57) ABSTRACT

A secure beacon-based system includes beacons that may generate dynamic beacon identifiers. A mobile device application may send a request to an application server, including a dynamic beacon identifier. The application server can locally compute the dynamic beacon identifier and compare it to the received beacon identifier to validate the request and determine whether to respond to the request.

17 Claims, 8 Drawing Sheets

(56) References Cited

U.S. PATENT DOCUMENTS

| | | |
|---|---|---|
| 8,781,502 B1 | 7/2014 | Middleton et al. |
| 8,856,916 B1 | 10/2014 | Sobel |
| 9,204,257 B1* | 12/2015 | Mendelson ............... G08G 1/14 |
| 2001/0045886 A1 | 11/2001 | Minowa |
| 2005/0070257 A1 | 3/2005 | Saarinen et al. |
| 2005/0093697 A1 | 5/2005 | Nichani |
| 2005/0233789 A1* | 10/2005 | Maekawa ............... H04L 12/12 |
| | | 463/1 |
| 2006/0214815 A1 | 9/2006 | Komatsu |
| 2006/0242908 A1 | 11/2006 | McKinney |
| 2007/0276765 A1 | 11/2007 | Hazel |
| 2010/0066503 A1 | 3/2010 | Rhie et al. |
| 2011/0137773 A1 | 6/2011 | Davis, III |
| 2011/0153495 A1 | 6/2011 | Dixon et al. |
| 2012/0235812 A1 | 9/2012 | Maia et al. |
| 2012/0254040 A1 | 10/2012 | Dixon et al. |
| 2013/0090134 A1 | 4/2013 | Heshmati |
| 2013/0165157 A1 | 6/2013 | Mapes |
| 2013/0201286 A1 | 8/2013 | Schockmel |
| 2013/0322674 A1 | 12/2013 | Ren |
| 2013/0332007 A1 | 12/2013 | Louboutin |
| 2014/0095227 A1 | 4/2014 | Parker et al. |
| 2014/0273857 A1 | 9/2014 | White et al. |
| 2014/0344036 A1* | 11/2014 | Serad ................. G06Q 30/0213 |
| | | 705/14.15 |
| 2015/0042451 A1 | 2/2015 | Matsumoto |
| 2015/0120558 A1 | 4/2015 | Andrews |
| 2015/0289207 A1* | 10/2015 | Kubo ................. H04W 52/0219 |
| | | 370/311 |
| 2015/0289295 A1* | 10/2015 | Granbery ............ H04W 76/023 |
| | | 370/230 |
| 2016/0007184 A1* | 1/2016 | Kulikov ................. G01S 5/0252 |
| | | 455/41.2 |
| 2016/0019726 A1 | 1/2016 | Joy et al. |
| 2016/0044460 A1* | 2/2016 | Cornaby ............... H04W 4/023 |
| | | 455/456.3 |
| 2016/0073264 A1* | 3/2016 | Van den Broeck ... H04W 4/021 |
| | | 455/411 |
| 2016/0087959 A1* | 3/2016 | Park ........................ H04L 63/08 |
| | | 713/171 |

FOREIGN PATENT DOCUMENTS

| | | |
|---|---|---|
| WO | 2015100185 | 7/2015 |
| WO | 2015123378 | 8/2015 |

OTHER PUBLICATIONS

"The extended European search report" on EP patent application No. 15196185.1, European Patent Office, dated Feb. 22, 2016, 7 pages.

Radius Networks, "How to Pop a Pass Using iBeacon Technology", http://developer.radiusnetworks.com/blog/ Downloaded on Nov. 28, 2015, 19 pages.

Masabi, "Transport Operators and Barcode M-Ticketing", London, UK, download date Oct. 28, 2015. http://www.masabi.com/wp-content/uploads/2011/02/Transport-Operators-and-Barcode-mTicketing.pdf.

HopOn, "HopOn Beacon", download date Oct. 28, 2015, 9 pages. http://hopon.co/technology/.

Two Canoes, "Bleu Meetings", download date Oct. 28, 2015, 5 pages. http://twocanoes.com/products/online-services/bleu-meetings.

MTA, "LIRR Seeking Development of Train Ticketing App", Jan. 26, 2013, 2 pages. http://www.mta.info/news/2013/01/26/lirr-seeking-development-train-ticketing-app.

Intercom, "How Mobile Ticket delivery works?", download date Oct. 29, 2015, 3 pages. http://www.intercom.ee/mobile-ticketing-works.

* cited by examiner

SMART BEACON DATA SECURITY

BACKGROUND

Beacons are starting to be deployed to provide micro-location information to receivers, which in-turn, can be used to invoke location-based applications. For example, a typical scenario may include multiple beacons deployed throughout a building. The beacons may include low-powered transmitters that broadcast unique identifiers (IDs). Mobile devices may run mobile applications that listen for the beacon signals to understand the current locations of the mobile devices in the building and to provide content to users based on the locations. For example, based on the location of the mobile device in a grocery store, which is determined from beacons, a mobile application may provide coupons relevant to a product displayed at the location. In another example, a mobile application may control appliances or lighting based on the current location determined from beacons.

Surprisingly, these type of beacon systems can be hacked using a mobile device to spoof a beacon. A hacker can enter a store or property of interest, and using a simple application, scan for the beacons in the store to discover beacon identifiers broadcasted by the beacons in the store. The hacker can create a custom application to act as a beacon that tricks a mobile application on a user's mobile device into believing that the user is inside the store, and the mobile application performs its functions as if the user is in the store. A hacker may use this technique to get unearned rewards, all the coupons offered by vendors, discounts, etc. In a more egregious situation, the mobile application may be designed to receive private user data, when the user is near a beacon. The hacker may inappropriately try to collect private user data by mimicking a beacon.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
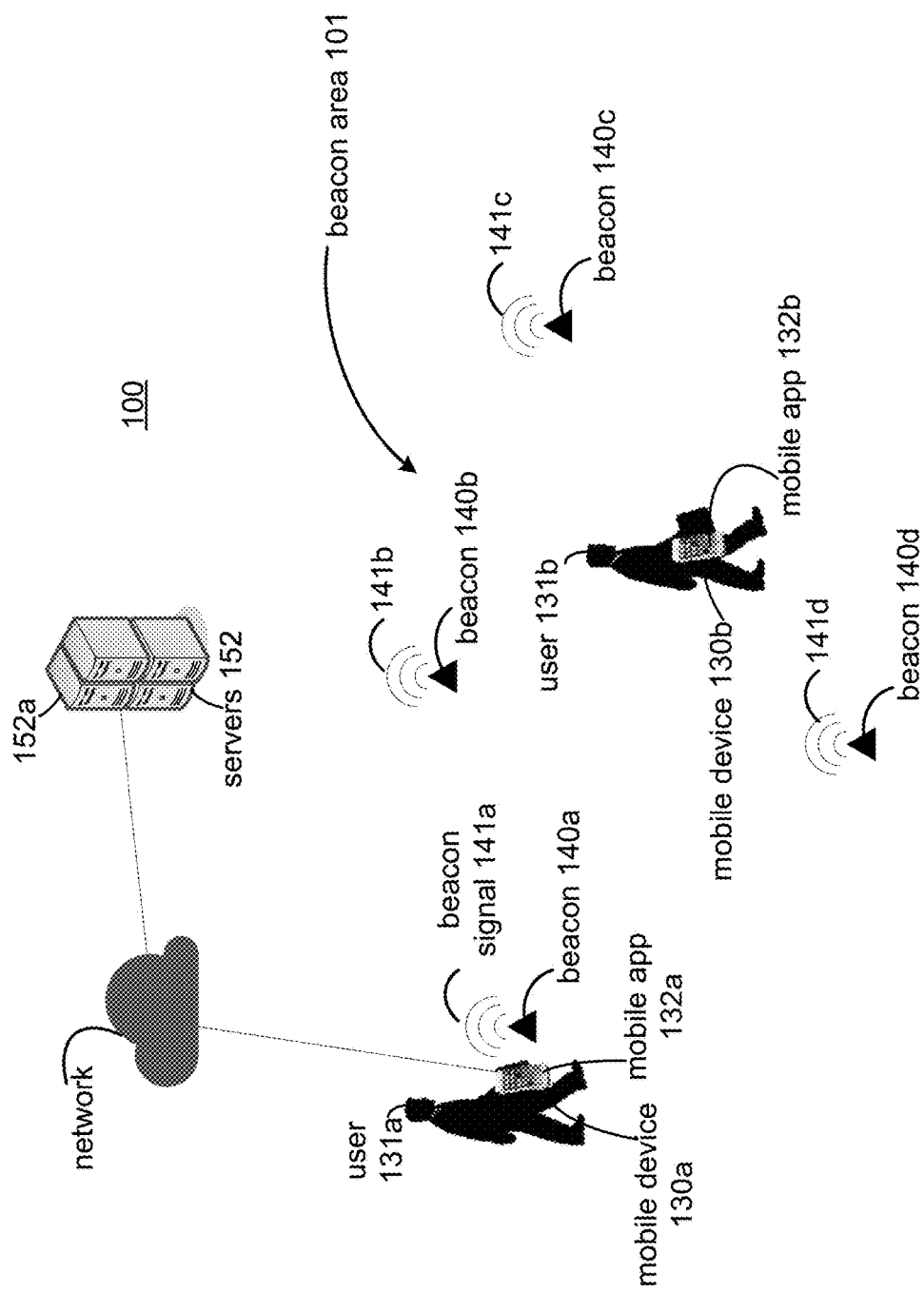
FIG. 1 illustrates a secure beacon-based system, according to an embodiment.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to embodiments described herein, smart beacons provide enhanced data security to try to prevent hacking and mimicking of beacons by dynamically generating unique beacon IDs or parts of the unique beacon IDs. A unique beacon ID can automatically be changed by the beacon at a desired interval or randomly. An application server, which may communicate with a mobile device running a beacon-related mobile application, stores the same function as the beacon for calculating the unique beacon ID and thus can determine the dynamically generated unique ID of the beacon as well. Accordingly, when the mobile application sends the beacon ID of the beacon to the application server, the application server can determine whether the received beacon ID matches the beacon ID calculated by the application server to determine whether a request from the mobile application is authentic instead of from a hacker.

A technical problem of current beacon-based systems is their high susceptibility to hacking and skimming by spoofing beacons. The smart beacons, systems and methods according to the embodiments provide enhanced data security for example through the dynamically generated beacon IDs and other mechanisms described herein. For example, hackers cannot spoof the beacon because the beacon ID is dynamic. Furthermore, methods described herein make it difficult for hackers to learn the processes and functions for calculating the dynamic beacon IDs, so the beacon IDs are not easily copied.

Another technical problem of current beacon-based systems is the inability to verify or corroborate a presence of a mobile device within range of a beacon. As discussed above, a hacker can mimic a beacon signal to trick an application server to send rewards, coupons, confidential data, etc. to the hacker, because the application server assumes a mobile device is in the presence of a beacon associated with the application server. The smart beacons, systems and methods according to various embodiments can validate that mobile applications and corresponding mobile devices are in the presence of beacons. The dynamically generated beacon IDs may be used for validation of the mobile applications by backend application servers, which provides for further data security and secure communications between mobile devices and application servers. For example, according to embodiments, an application server has the same beacon ID calculation function as the beacon. Accordingly, the application server can validate a mobile application by comparing a beacon ID generated by the server to a beacon ID provided by the mobile application. If the mobile application is validated, the application server assumes the mobile device is located near or within the broadcast range of the beacon, and the application server provides the mobile application with information and services associated with the beacon location.

Furthermore, the technical solutions to the technical problems may include modified beacon hardware that can generate dynamic beacon IDs. Conventional beacons are low-cost transmitters designed to broadcast static beacon IDs. The smart beacons according to the embodiments may include additional logic and storage in their hardware to execute functions to generate dynamic beacon IDs.

In one example, the beacon ID may include a universally unique identifier (UUID) a major ID and/or a minor ID. The UUID can be used to differentiate a large group of related beacons. For example, all the beacons in the same grocery store may have the same UUID or all the beacons maintained by the same chain of grocery stores have the same UUID. The major ID may be used to distinguish a smaller subset of beacons within the larger group. For example, all the beacons in the same store have the same major ID or all the beacons in a particular section of the store have the same major ID. The minor ID identifies individual beacons and is different for each beacon. So if a user is next to a beacon, the user's location may be determined by determining the location of the beacon having the minor ID.

As indicated above, a complete unique ID of the beacon can be generated dynamically or a part of beacon ID may be dynamically generated. To dynamically generate a part of a beacon ID, the beacon ID is segregated into a static part and dynamic part(s). For example, the same UUID may be maintained but a different major ID and/or minor ID is dynamically generated. In another example, only the minor ID is dynamically generated. The application server can independently calculate the dynamic beacon ID or the dynamic part(s) of the beacon ID to verify the authenticity of the beacon ID, the mobile application, and the presence of a mobile device at the beacon. Furthermore, the functions for dynamically generating the beacon IDs may be based on time, location, etc., and may also follow certain mathematical functions. In another example, it is also possible that the major and minor IDs remain static, but a payload of the broadcasted beacon message is dynamically generated and this payload is validated in the application server. The dynamic payload may be based on a measured dynamic value, such as temperature, noise level, humidity, time, battery life, light conditions, etc. One or both of the payload and ID may be dynamic. By way of example, one or more of the following may be varied: major ID may be dynamic in part or in full; minor ID may be dynamic in part or in full; and at least part of the payload may be dynamic. The generation of dynamic beacon IDs and/or payloads is further described below.

Figure 5:
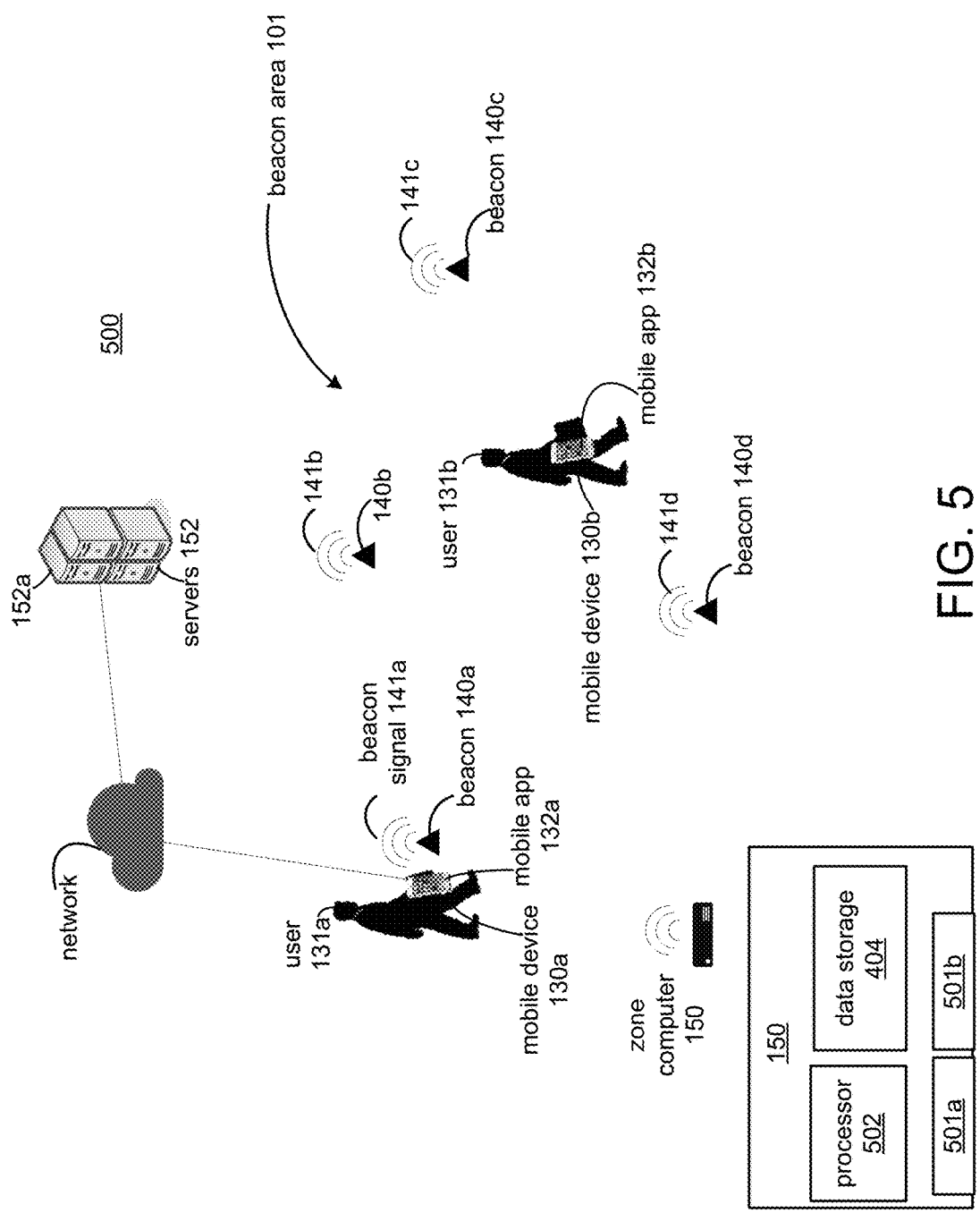
FIG. 5 illustrates a secure beacon-based system, according to another embodiment.

FIG. 1 illustrates a secure beacon-based system 100 according to an embodiment. The system 100 may include beacons 140, mobile devices 130 and servers 152, which may include at least one application server 152a. The mobile devices 130 run mobile applications 132 to capture beacon IDs from the beacons 140 and can exchange information with servers 152 based on information captured from the beacons 140. The mobile applications 132 can also exchange information with zone computers, such as shown in FIG. 5 based on information captured from the beacons 140.

The mobile devices 130 may include mobile devices 130a and 130b shown for users 131a and 131b respectively to illustrate that users can use mobile devices to facilitate communication with the beacons 140 and the zone computers 150. Of course, any number of individuals using mobile devices may utilize the system 100. Also, multiple beacons 140, including beacons labeled 140a-d, and multiple servers 152, including a server labeled 152a, are shown, however, any number of beacons and servers may be included in the system 100 depending on various factors, such as how many users need to be processed simultaneously, size of geographic area employing the beacons, etc. A geographic area, shown as beacon area 101, having the beacons 140 may be a building, a room in a building, a section of an open area, which may be indoor or outdoor, or a geographic area that may be located in a mobile structure, such as a vehicle.

The beacons 140 are hardware that can broadcast beacon signals, shown as signals 141. The beacon signals 141 may be periodically broadcasted and include beacon IDs for their respective beacons. The beacons 140 may be standalone devices or incorporated into another device. The beacons 140 broadcast beacon signals 141 at a short distance, such as up to 100 meters or a much shorter distance, such as up to 4 centimeters. For example, the beacons 140 may be Bluetooth, Bluetooth Low Energy, or near-field communication beacons, or Wi-Fi and the range of different types of beacons may be different. The beacons 140 may be part of a local positioning system, such as IBEACONS, that are used to wirelessly determine the position of the mobile devices 130 inside the geographic area 101. Each of the beacons 140 is in a sub-location of the geographic area 101. In one example, a beacon's range defines its sub-location. The beacons 140 can generate dynamic IDs and may include hardware and data storage to generate the dynamic IDs as described in further detail below.

The mobile devices 130 may be any computer that a user may carry and that can run applications including the mobile applications 132. Examples of the mobile devices 130 include mobile phones, tablets, wearable computers, such as GOOGLE glass or smart devices embedded into clothing, a smart watch, fitness tracker, or wireless enabled shoes, or some other type of mobile computer. The mobile devices 130 may include short-distance wireless communication interfaces that can wirelessly communicate with beacons 140, and possibly the zone computers 150 if the zone computers 150 are located in the geographic area 101, assuming the mobile devices 130 are within range.

In one example, Bluetooth Low Energy (BLE) or Bluetooth 4.0 or future versions of Bluetooth wireless interfaces may be used. BLE is a wireless technology that is intended to provide reduced power consumption when compared to Bluetooth but has a similar range to Bluetooth. Bluetooth may be used but may consume more battery power and is more susceptible to cross talk. BLE and Bluetooth transmitters may have a range of 10 meters but may be modified to have longer ranges. In one example, the short-distance wireless communication interfaces may include near-field communication (NFC) interfaces. NFC is a set of standards for smartphones and other mobile devices to establish radio communication with each other and other computers by touching them together or bringing them into close proximity. The close proximity may be a few inches or few centimeters (e.g., 4 centimeters). Other wireless interfaces may be used. The components of the system 100 may have one or multiple types of short-distance wireless interfaces.

The mobile devices 130 include a short-distance interface that matches the beacons signals broadcast from the beacons 140. So if the beacons 140 broadcast Bluetooth signals, the mobile device 130 at least include a Bluetooth interface to receive the signals, and so on. The mobile devices 130 may utilize other communication interfaces as well, which are wired or wireless and may be network interfaces that can communicate with computers in a local area network or a wide area network, but communication between the beacons 140 and the mobile devices 130 may rely on the short-distance wireless interfaces for communication with each other.

The beacons 140 may be embedded in a physical infrastructure, such as a wall, an entry area, a computer housing, etc., or may be standalone. The beacons may be part of another system, such as incorporated in a zone computer. The beacons 140 may broadcast beacon IDs every x milliseconds (ms), where x>1 ms and may be less than 200 ms, but other intervals may be used and the intervals may depend on the environment and use case. The broadcasted beacon IDs may be dynamically generated as is further described below. The beacon broadcasts may include other information. Transmission power, which is used to determine proximity (distance) from the beacon, may be in beacon broadcasts. For example, the transmission power is defined as the strength of the signal exactly one meter from the beacon. The mobile devices 130 can then use this as a baseline to determine their current distance from a beacon.

The mobile devices 130 listen for the broadcasts from the beacons 140. The beacon ID, signal strength (such as received signal strength indicator (RSSI), transmission power, and/or received Power) of the beacon's broadcasts, azimuth and angle of the beacon signal 141 (e.g., calculated from the received wireless broadcast) help identify the location of the mobile device and verify its presence near a beacon. When a mobile device is in range of one or more of the beacons 140, beacon IDs received from the beacons at the mobile device may invoke a mobile application to launch in the mobile device if it is not already running.

The mobile devices 130 may have network interfaces. For example, the network interfaces may include a WiFi interface, cellular interface, etc. The mobile devices 130 may connect to the servers 152 via a network through their network interfaces. The servers 152 may include application servers that provide information and services for users through the mobile applications 132 or perform other actions. The servers may include other types of servers, such as database servers, web servers, etc. The services and information provided by the servers 152 are related to the beacons 140. For example, the services and information are provided to a mobile application if an application server determines that the mobile device is in proximity or within range of a beacon. The information and services may be associated with the location of the beacon. Different information and services may be provided for different beacons. In one example, the application server provides coupons, rewards, content, etc., to the mobile application based on the location of the beacon. In other examples, the application server may perform other actions. The servers 152 may include web servers and/or database servers. Also, the servers 152 are shown as multiple servers, but may include one or more servers.

Figure 2:
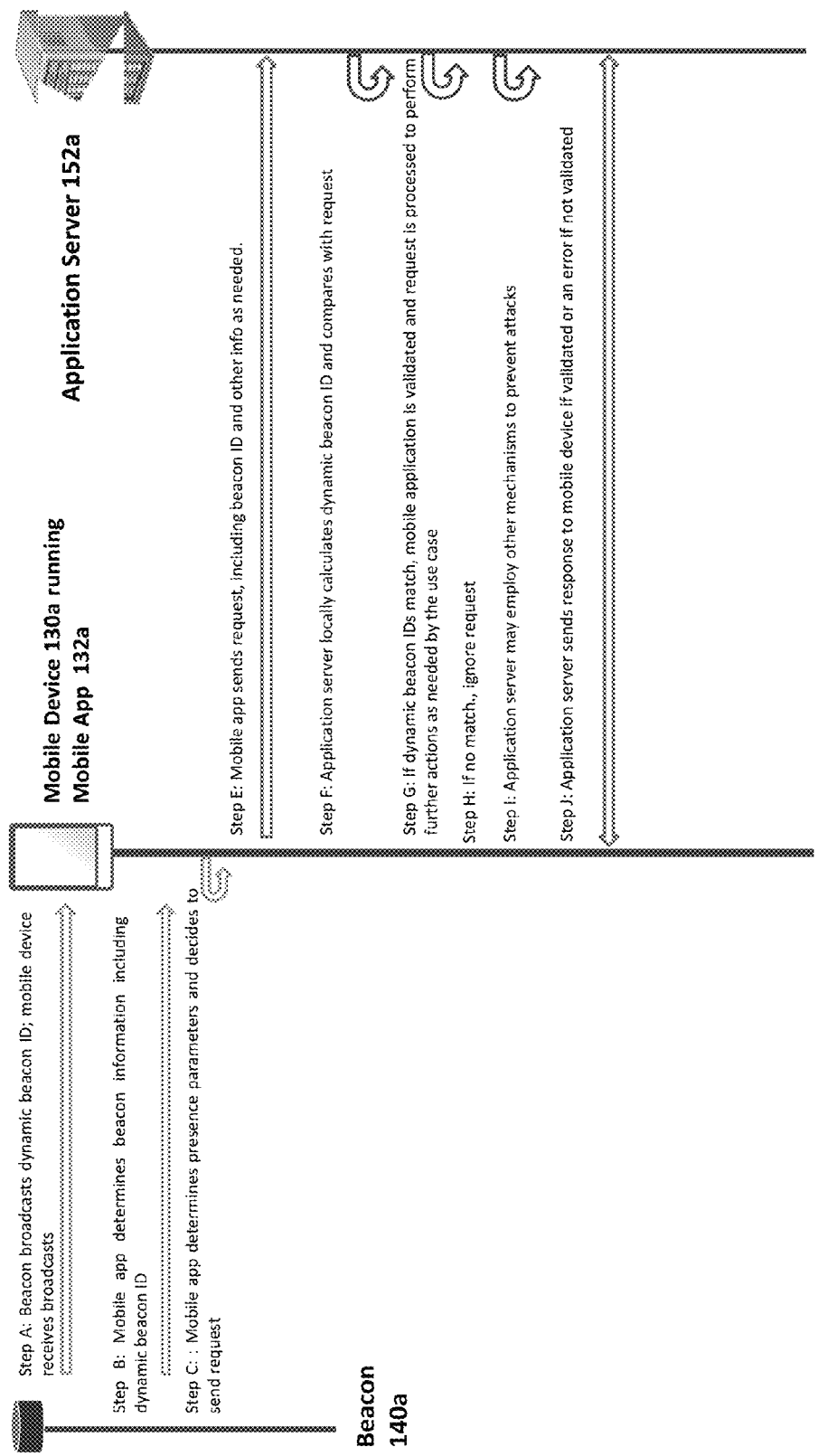
FIG. 2 illustrates a data flow diagram for interaction between components of the system shown in FIG. 1, according to an embodiment.

FIG. 2 shows the interaction between the beacons 140, the mobile devices 130 and the servers 152 of the system 100 and the steps performed by each component. For example, assume user 131a is near beacon 140a shown in FIG. 1.

The beacons 140a-d periodically broadcast their unique IDs and optional payload. The payload may indicate location, such as store name, etc., or a lookup may be performed on an ID, such as the major ID or the minor ID to determine location. The beacon IDs are dynamic and may be varied at intervals. One or both of the payload and ID may be dynamic and varied at intervals. Varying the beacon ID is discussed below but the payload may be varied instead or in addition to the beacon ID. An interval may include every time a beacon ID is broadcasted or a duration that covers multiple broadcasts. A beacon ID may be calculated according to at least one beacon ID calculation function and input parameters used as input to the function.

At step A, the mobile device 130a receives a broadcast from beacon 140a when in range of the beacon 140a. The broadcast includes the dynamic beacon ID and may include additional information, such as location information, transmission power, etc. The dynamic beacon ID is calculated according to at least one beacon ID calculation function and input parameters for the beacon ID calculation function. The input parameters may include time, location, etc.

At step B, if the mobile application 132a isn't already running, the mobile application 132a is launched for example if the operating system of the mobile device 130a recognizes a portion of an ID of the beacon as a registered ID. For example, beacon IDs that have a predetermined major ID and/or minor ID invoke launching of the mobile application 132a. Also, the mobile application 132a determines the beacon ID from the broadcast and presence parameters which may include information to establish that the mobile device 130a is in close proximity to the beacon 140a. At step C, the mobile application 132a may use the presence parameters to determine whether to send a request to the application server 152a. The presence parameters may include signal, strength, dwell time, angle, azimuth, etc. Other examples include information from various sensors in the mobile device 130a, such as to determine whether the user 131a is stationary, dwell time of the user 131a at the sub-location of the beacon 140a, and other information such as user profile information. The mobile application 132a for example decides to send the request based on the presence parameters. For example, the mobile application 132a may only send the request if it can determine from the presence parameters, including sensor measurements, that the mobile device 130 is stationary near the beacon for a predetermined period of time, or does not leave the sub-location of the beacon for the predetermined period of time. The servers 152 may include application servers that provide information and services for users through the mobile applications 132 or perform other actions related to the mobile application being in the presence of the beacon 140a. The request sent to the application server 152a is a request for the services and/or information.

At step E, the mobile application 132a sends the request to the application server 152a, including the beacon ID and other information as needed for the application server 152a to calculate the beacon ID.

Steps F-J are performed at the application server 152a. Generally the steps, which are described in further detail below, include receiving the request from the mobile application 132a; locally computing the beacon ID or retrieving the locally computed beacon ID; comparing the locally computed beacon ID with the dynamic beacon ID in the request; determining whether the mobile application is validated based on the comparison; and responding to the request or ignoring the request depending on whether the mobile application is validated. If the mobile application is not validated additionally actions may be taken, such as permanently or temporarily blocking a user account associated with the mobile application. At step F, the application server 152a locally calculates the beacon ID to compare the locally calculated beacon ID with the beacon ID received in the request. The application server 152a uses the same beacon ID calculation function or functions and the same input parameters that the beacon 140a used to calculate the dynamic beacon ID. In one example, the entire beacon ID is not dynamic. Part of the beacon ID may be dynamic, such as beacons may have the same UUID, but dynamic major ID and/or minor ID. Thus, when the mobile application 132a sends the dynamic beacon ID to the application server 152a, the application server 152a segregates the beacon ID into the dynamic portion and the static portion, and locally calculates the dynamic portion to determine whether there is a match with the dynamic portion received in the request. If there is a match, the application server 152a assumes the mobile device 130a is located within range of the beacon 140a.

At step G, if the dynamic beacon IDs match, the request is processed to perform further actions and the mobile application 132a is considered to be validated; otherwise, at step H, the request is ignored. At step I, the application server 152a may employ techniques to prevent attacks. For example, the application server 152a may recognize that a plurality of failed validations occurred in a short time period. In another example, the application server 152a may recognize that repeated failed validations are associated with the same beacon or the same mobile device or mobile application. These patterns may be indicative of an attempt to hack the system, and the application server 152a may generate alerts or block requests or perform other corrective actions. At step J, the application server 152a sends a response to the mobile application 132a. The response may include services or information for the request if the mobile application 132a was validated or an indication that the request was denied.

Figure 3:
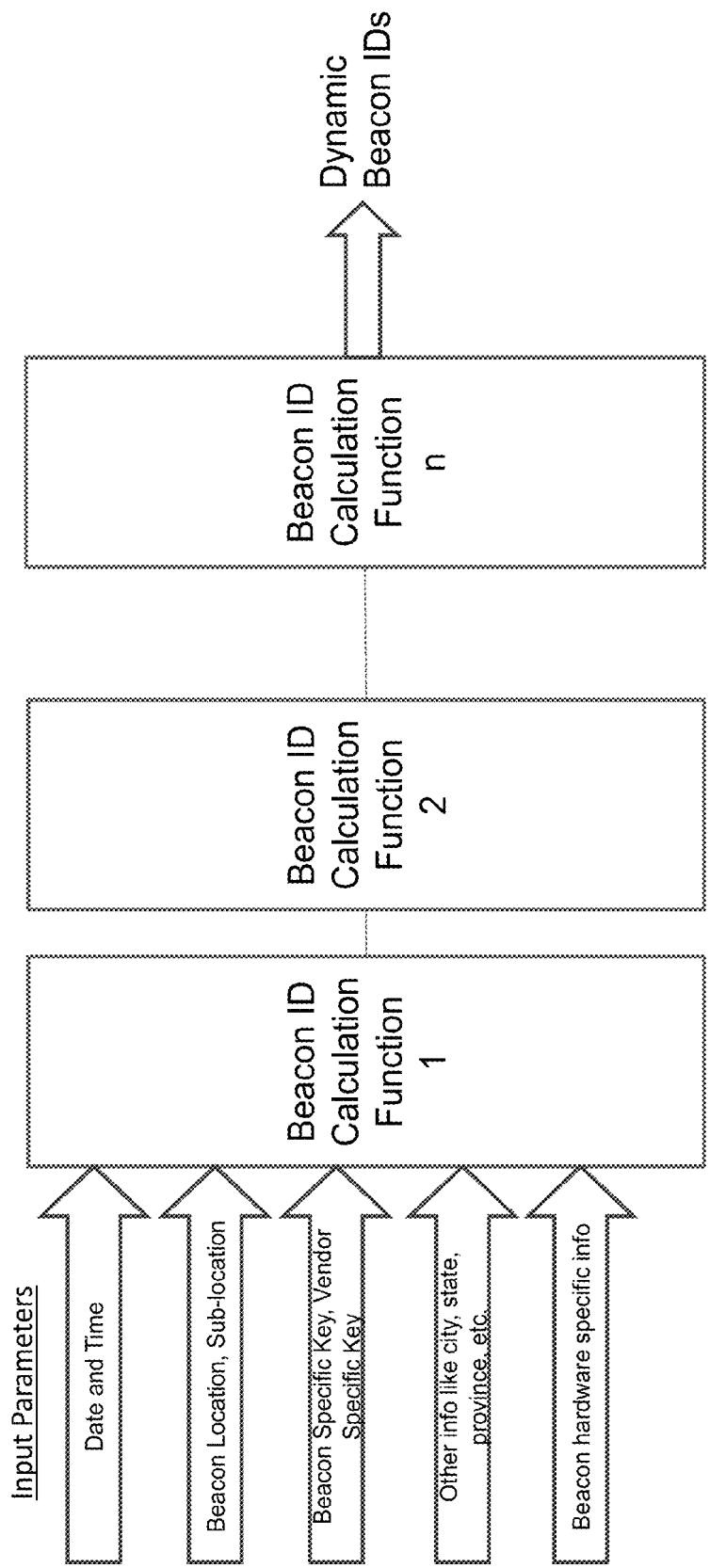
FIG. 3 illustrates calculation of dynamic beacon IDs using one or more beacon ID calculation functions, according to an embodiment.

FIG. 3 illustrates calculation of dynamic beacon IDs using one or more beacon ID calculation functions and input parameters. Depending on the embodiment, the dynamic beacon IDs may be calculated by one or more of the beacons 140, the mobile applications 132, servers 152 and zone computers which are described below. At least two of the components of the system 100, such as a beacon and an application server, are expected to use the same input parameters and beacon ID calculation functions to calculate a dynamic beacon ID for validation, such as described in FIG. 2.

The beacon ID or a portion of the beacon ID is dynamic (e.g., varied) and may be unique to the beacon. One or more of the input parameters may vary to generate the dynamic beacon ID, so the beacon ID is varied per interval or per a set of intervals. The interval for example refers to the broadcast interval of the beacon that broadcasts the beacon ID. Also, one or more of the beacon ID calculation functions may be varied or the sequence of the functions may be varied to generate the dynamic beacon ID.

The input parameters may include at least a plurality of date, time, beacon location, beacon sub-location, beacon specific key, vendor specific key, government assigned geographic information (e.g., city, state, province, city code, zip code, etc.), and beacon hardware specific information. One or more of the input parameters vary. For example, time and date vary, which causes the beacon ID to vary as it is repeatedly generated for broadcasting. As discussed above, if a beacon and the application server are expected to use the same input parameters and beacon ID calculation functions to calculate the dynamic beacon ID, then both the beacon and the application server must know the current value of the variable input parameters. For example, clocks for the beacon and the application server are synchronized so they use the same time and date input parameters, or the beacon and the application server share an offset which is known to the server (e.g., Beacon Time+x=Server Time, where x is specific for a beacon or a group of beacons or all beacons and is known to the server). If a rolling code is used as a variable parameter, the functions for calculating the rolling code at the beacon and the application server should be the same and synchronized so they produce the same rolling code.

The location information may include a location of the beacon's sub-location. This may include coordinates, a predetermined sector or section of a building, etc. A beacon specific key may be provisioned inside the beacon when it is manufactured or programmed. The specific key may be stored inside a secure storage in the beacon like a secure element or a secure isolated processor core inside the beacon. The key is specific and unique to each beacon. A vendor specific key may be provisioned inside the beacon when it is manufactured or programmed. The vendor specific key may also be stored inside a secure storage in the beacon. The beacon key and the vendor specific key in the beacon is also stored in a server of the servers 152. The keys may be stored in a secure storage. The vendor specific key is same for all beacons for a particular business or city or province or likewise. The keys may include a UUID, a major ID and/or a minor ID. The minor ID may be a beacon specific key. The UUID or the major ID may be vendor specific. In one example, a secure element runs an OS that can run applets and generate the dynamic part of the ID securely. The secure element may be a secure microcontroller that may be an embedded circuit.

Part of the beacon ID may be static, such as the minor ID, and part of the beacon ID may be dynamic and may be calculated according to the beacon ID functions and variable parameters. Also, information sent with the beacon ID may be used to calculate the beacon ID.

FIG. 3 also shows multiple beacon ID calculation functions 1 to n. One function or multiple functions may be used to calculate the beacon ID. The output of one function is the input of another function, so the functions may be logically connected in a serial format. In an example, the sequence of the serial connected functions may be varied to vary the beacon ID. The indication of the new sequence may be sent with the request to the application server or is otherwise determined by the application server. In another example, one or more input parameters are associated with each of the functions in a predefined order to generate the dynamic beacon ID. The beacon ID calculation functions may be any function that can take an input to calculate an output in a manner that makes it difficult to determine the input from the output. The beacon ID calculation functions may include encryption functions or one-way hash functions. THE RSA encryption function or the MD5 hash generator may be used.

Figure 4:
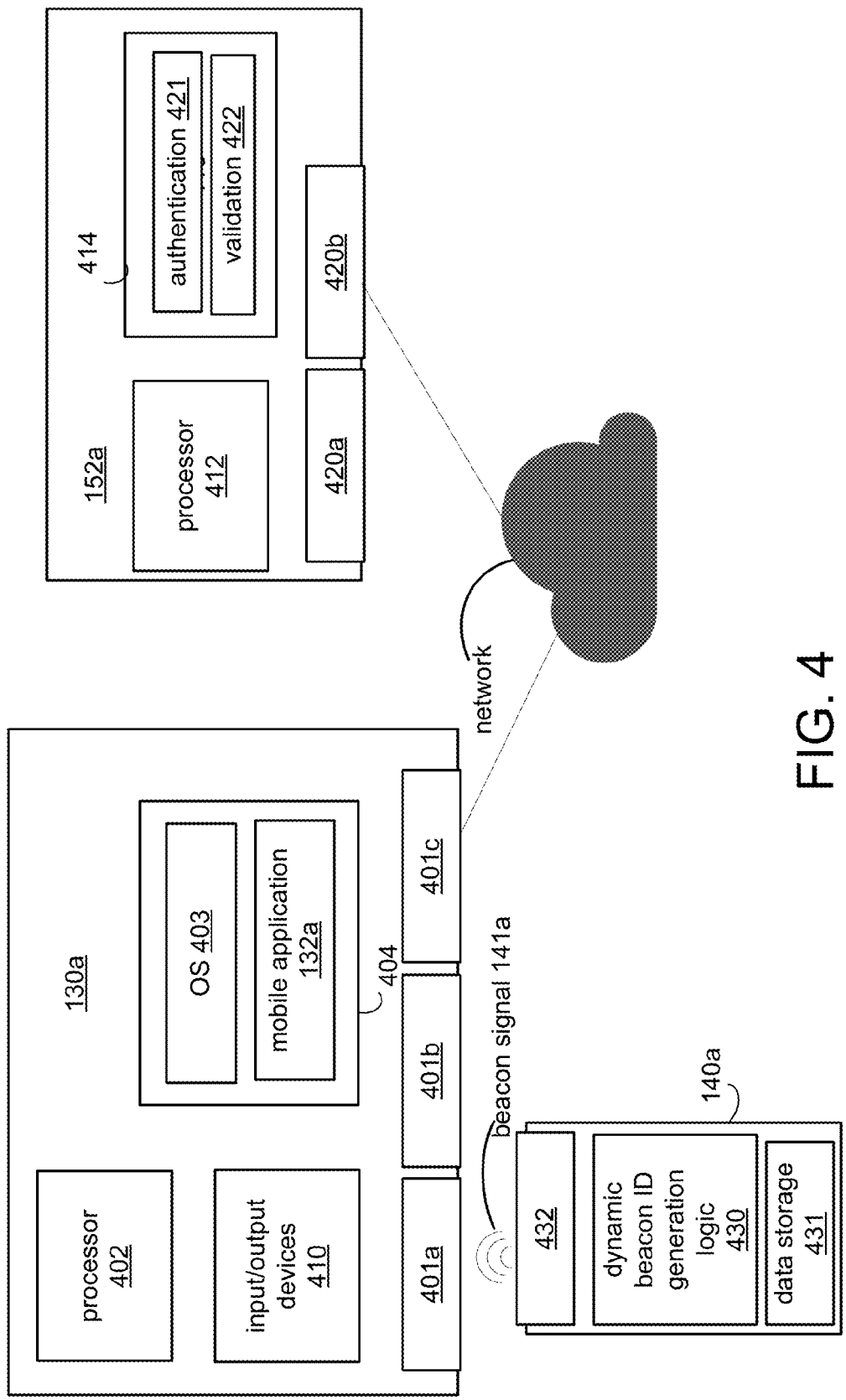
FIG. 4 illustrates a hardware diagram of system components, according to an embodiment.

FIG. 4 shows a block diagram of the beacon 140a, mobile device 130a and the application server 152a in the system 100 but is representative of any of the beacons 140, mobile devices 130 and servers 152 that may be used in the system 100.

The beacon 140a includes hardware to calculate the dynamic beacon IDs. The hardware may include dynamic beacon ID generation logic 430 and a data storage 431 and a short-distance transmitter 432. The data storage 431 may be memory. The dynamic beacon ID generation logic 430 may include a low-power processor or microcontroller with limited functionality to execute the beacon ID calculation functions according to input parameters. The dynamic beacon ID generation logic 430 may generate a dynamic payload. The short-distance transmitter 432 may include an antenna and circuit that can broadcast the beacon ID. The transmitter is short distance, such as having the range of BLE, NFC, etc. The data storage 431 may store input parameters and may include a secure storage to store a beacon specific key or other information. The beacon 140a broadcasts a dynamic beacon ID at intervals via the short-distance transmitter 432. The mobile device 130a or another device in range may receive the broadcasts.

The mobile device 130a may include multiple interfaces 401, wired or wireless, for communicating with other devices. For example, interface 401c may be a Wi-Fi interface or a cellular interface. The mobile device may have both a Wi-Fi and a cellular interface. 401a may include a Bluetooth or BLE interface. In one example, message exchanges between the mobile device 130a and the zone computer 150a are done through Bluetooth or Bluetooth 4.0 or BLE or future versions of Bluetooth but other interfaces may be used. Interface 401b may be a NFC interface, but the mobile device 130a may have both Bluetooth and NFC interfaces and multiple other interfaces. Interface 401b may be for communicating with the beacons 140, for example, for triangulation-based or tap-based detection.

The mobile device 130a includes a processor 402 and data storage 404. The processor 402 for example is an integrated circuit. The processor 402 may be a chipset with central processing unit and/or custom processing circuits, such as an application-specific integrated circuit (ASIC) or field-programmable gate array (FPGA). The processor 402 may run an operating system (OS) 403 and applications, including the mobile application 132a. The OS 403 and the applications are stored in data storage 404. The mobile device 130a includes input/output (I/O) devices 410, such as keyboard, touch screen display, speaker, etc. The I/O devices 410 may provide audio, visual and/or tactile output to indicate whether a user has been validated and allowed access to the restricted area 101 or whether the user is denied access.

The application server 152a includes a processor 412 and a data storage 414. The processor 412 is an integrated circuit. The processor 412 may execute software or firmware or comprise custom processing circuits, such as an application-specific integrated circuit (ASIC) or field-programmable gate array (FPGA). The data storage includes software or firmware including machine readable instructions. The software or firmware may include subroutines or applications for authentication 421 and validation 422. Authentication 421 may include determining whether the mobile application 132a or the mobile device 130a is authorized to receive services and information provided by the application server 152. For example, an access control list or another list is stored that identifies authorized users and may be used to authorize users with a password. The validation 422 is described above and includes locally computing the dynamic beacon ID based on input parameters to compare to the beacon ID received in a request from the mobile application 132a to validate the mobile application 132a. The application server 152a may include I/O devices or be connected to I/O devices for user interaction.

The application server 152a also includes multiple interfaces 420, wired or wireless, for communicating with other devices. For example, interface 420a may be a Wi-Fi interface or a cellular interface. 420b may be a wired network interface. In one example, the mobile device 130a and the application server 152a communicate via access networks and the Internet, and the interfaces 420 may include a network interface for a local area network or a wide area network.

The data storage 414 may store machine readable instructions executable by the processor to perform the functions for authentication 421 and validation 422 and other functions. Also, the data storage 414 may store beacon ID calculation functions, input parameters and any other data used by the application server 152a.

According to another embodiment of the secure beacon-based system, which is shown as 500 in FIG. 5, the geographic location 101 of the beacons 140 may include a zone computer 150 or multiple zone computers (not shown), which can communicate with the mobile devices 130 via BLE or another short-distance interface. In this embodiment, the beacons 140 may be conventional beacons that transmit static, unique beacon IDs or may be smart beacons that transmit dynamic beacon IDs. For example, in response to the mobile device 130a receiving the beacon broadcast with the beacon ID, the mobile application 132a calculates a peripheral mode ID from the beacon ID and enters into a peripheral mode. In the peripheral mode, the mobile device 130a may operate similar to a beacon and broadcast the peripheral mode ID. In the peripheral mode, the mobile device 130a for example advertises service(s) and/or characteristic(s) of the mobile device 130a and/or the mobile application 132a along with the peripheral mode ID. The peripheral mode ID may include one or more unique IDs. The peripheral mode ID may be dynamic and may be calculated similar to a dynamic beacon ID, such as described with respect to FIG. 3. Also, a device receiving the broadcasted peripheral mode ID may compare the broadcasted peripheral mode ID with a locally computed peripheral mode ID to validate the broadcaster, similar to step G in FIG. 2. In peripheral mode, the mobile application 132a broadcasts its presence to nearby devices, for example, via a BLE interface or other short-distance interface. Any BLE device within range that recognize the mobile device 130a may connect with the mobile device 130a to execute certain services and exchange data. The zone computer 150a may include a processor 502, communication interfaces 501, and data storage 404. An interface 401a may include a short-distance interface, such as BLE, and interface 402 may include a network interface for example to connect to the servers 152. The data storage may include machine readable instructions to authenticate the mobile application 132a and generate a single-use unique code.

When the mobile application 132a is in peripheral mode, and in range of the zone computer 150, the zone computer 150 authenticates the mobile application 132a. For example, the zone computer 150 connects to the mobile application 132a and mutual authentication is performed. After authenticating, the zone computer 150 generates the single-use unique code and sends it to the mobile application 132a. The single-use unique code can be one-time use only, or valid for the current date, time and location, or any other variations of different parameters. The mobile application 132a sends the unique code received from the zone computer 150 to the application server 152a and the beacon ID of the beacon 140a (or multiple beacon IDs if the beacon 140a has multiple beacon IDs). The application server validates that the unique code is valid and related to the beacon ID of the beacon 140a, and then performs the actions as needed by the use case, such as returning rewards, coupons, etc.

Figure 6A:
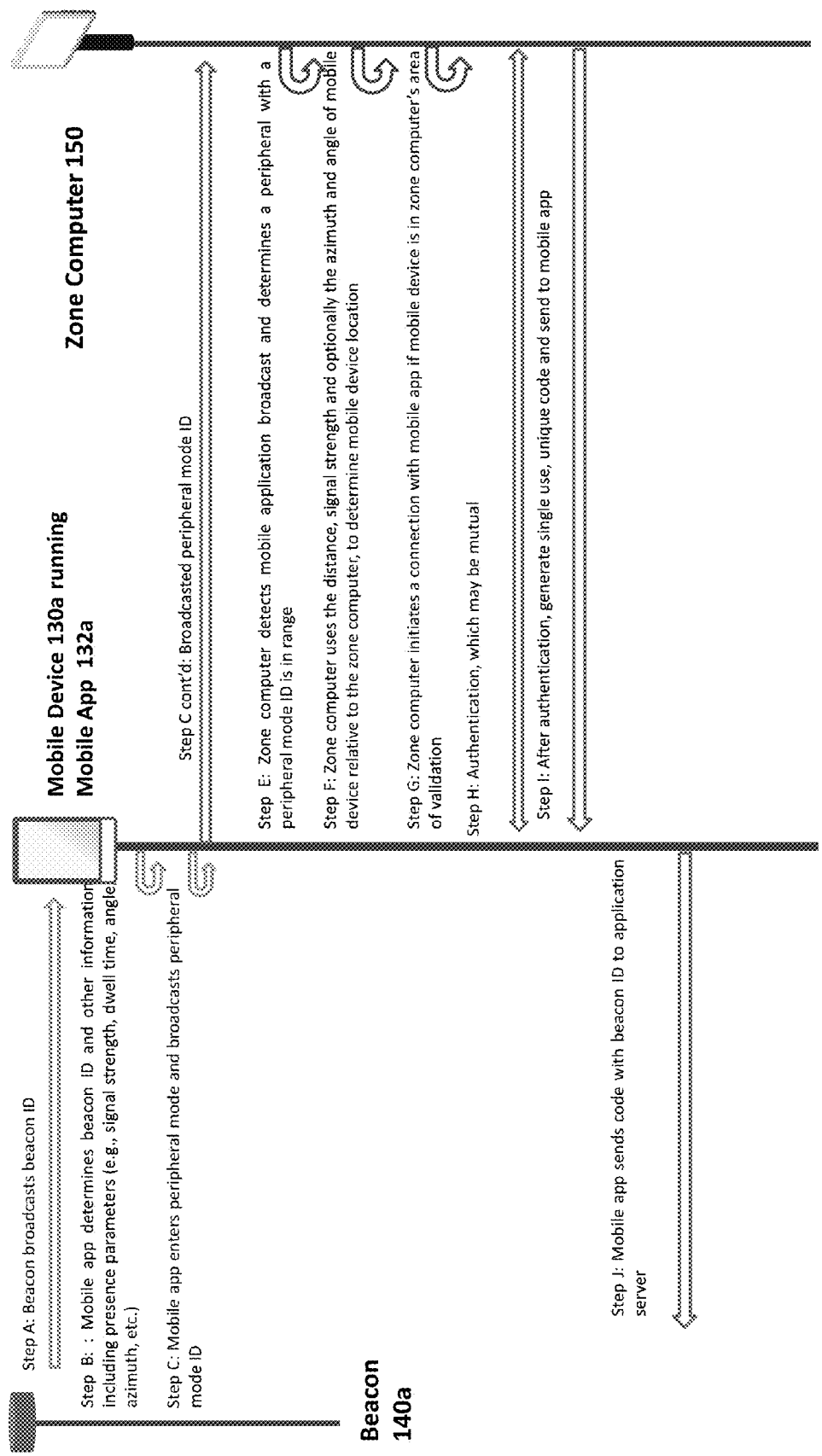
FIGS. 6A-B illustrate a data flow diagram for interaction between components of the system shown in FIG. 5, according to an embodiment.
Figure 6B:
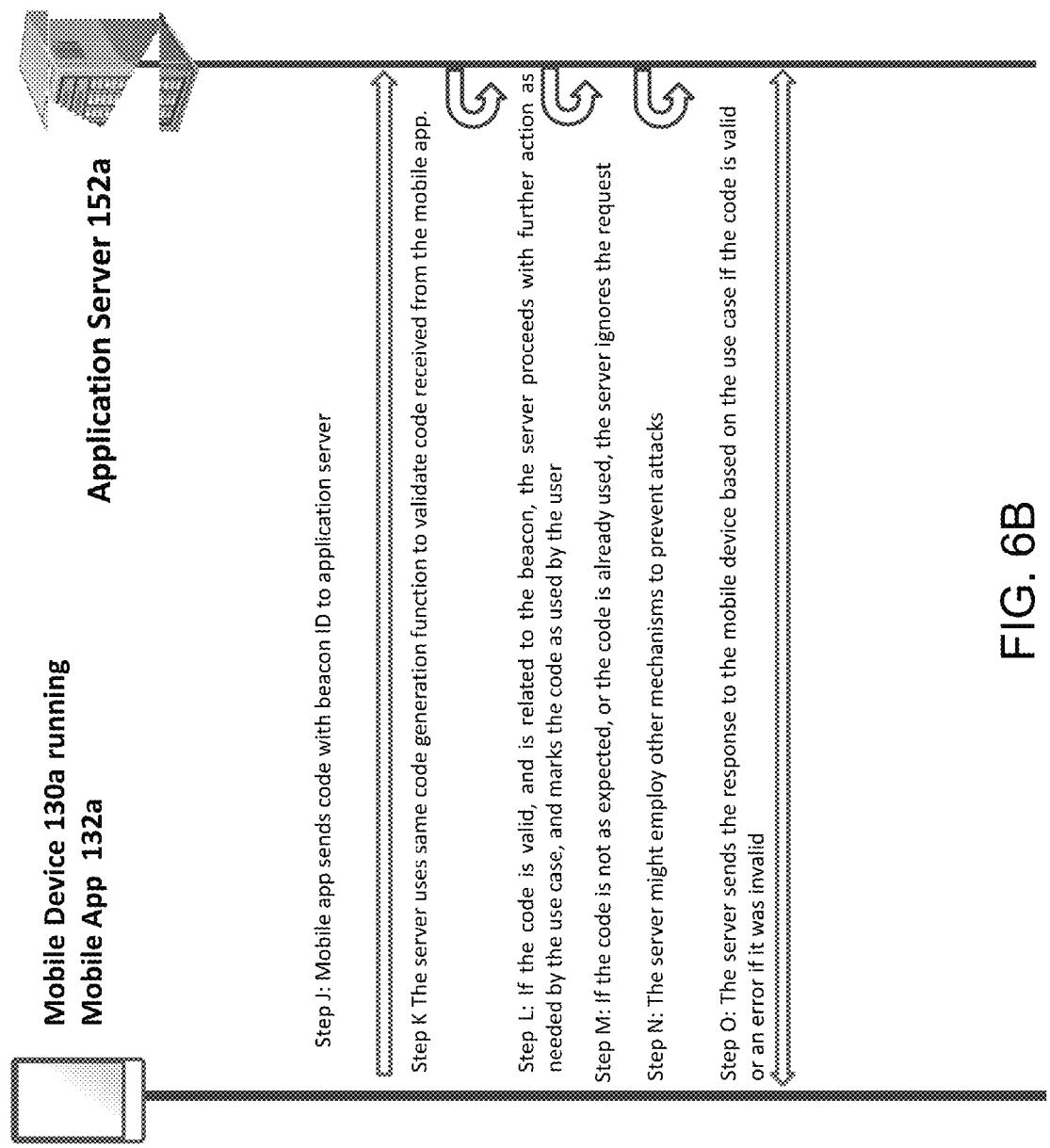

FIGS. 6A-B show the data flow diagram for the system 500. At step A, the beacon broadcasts its beacon ID and is received by the mobile device 130a which is within range of the beacon 140a. The beacon broadcasts may include additional information, such as location information, transmission power, etc.

At step B, the mobile application 132a determines the beacon ID from the broadcast and presence parameters which may include information to establish that the mobile device 130a is in close proximity to the beacon 140a. The presence parameters may include signal, strength, dwell time, angle, azimuth, etc. Other examples include information from various sensors in the mobile device 130a, such as to determine whether the user 131a is stationary, dwell time of the user 131a at the sub-location of the beacon 140a, and other information such as user profile information.

At step C, in response to the mobile device 130a receiving the beacon broadcast with the beacon ID, the mobile application 132a calculates a peripheral mode ID from the beacon ID and enters into a peripheral mode. In the peripheral mode, the mobile device 130a may operate similar to a beacon and broadcast the peripheral mode ID. The peripheral mode ID may be dynamic, as described above. In peripheral mode, the mobile application 132a broadcasts its presence to nearby devices, for example, via a BLE interface or other short-distance interface. The mobile application 132a may enter into peripheral mode if it determines from the presence parameters that the user 131a is near the beacon and desires to receive information regarding the beacon's sub-location, such as information about products near the beacon or other information depending on the use case of the system.

At step E, the zone computer 150 detects the broadcasted peripheral mode ID and determines that a peripheral with a known peripheral mode ID is in range. At steps F and G, the zone computer 150 determines the distance, signal strength and optionally the azimuth and angle of the mobile device 130a relative to the zone computer 150 to determine whether the mobile device 130a is in an area of validation of the zone computer 150a. The area of validation is an area of predetermined size that is adjacent the zone computer 150.

If the mobile device 130a is in the area of validation, the zone computer initiates a connection at step G and mutual authentication is performed at step H. At steps I and J, the single use, unique code is generated and sent to the mobile application 132a. A function to calculate the code which is used by the zone computer 150a is also stored in the application server 152a and is used by the application server 152a to locally compute the code and validate the code. For example, at step K, the application server 152a locally calculates the single use code and compares it to the received code to determine whether they match. If there is a match (i.e., they are equal), then at step L, actions are performed, such as sending rewards, coupons, etc., to the mobile application 132a. Otherwise, the received code is ignored at step M. At step N, the application server 152a may employ techniques to prevent attacks. At step O, the application server 152a sends a response to the mobile application 132a. The response may include services or information for the request if the mobile application 132a was validated or an indication that the request was denied.

A variation of the embodiment shown in FIGS. 5 and 6 is that the zone computer 150 enters a peripheral mode instead of the mobile device 130a. The mobile application 132a scans for a certain peripheral with services/characteristics and the unique ID that the mobile application 132a calculated from the beacon ID. The zone computer 150a connects to the mobile device 130a, and requests the single use code. Then, the steps K-O shown in FIG. 6 are performed.

Figure 7:
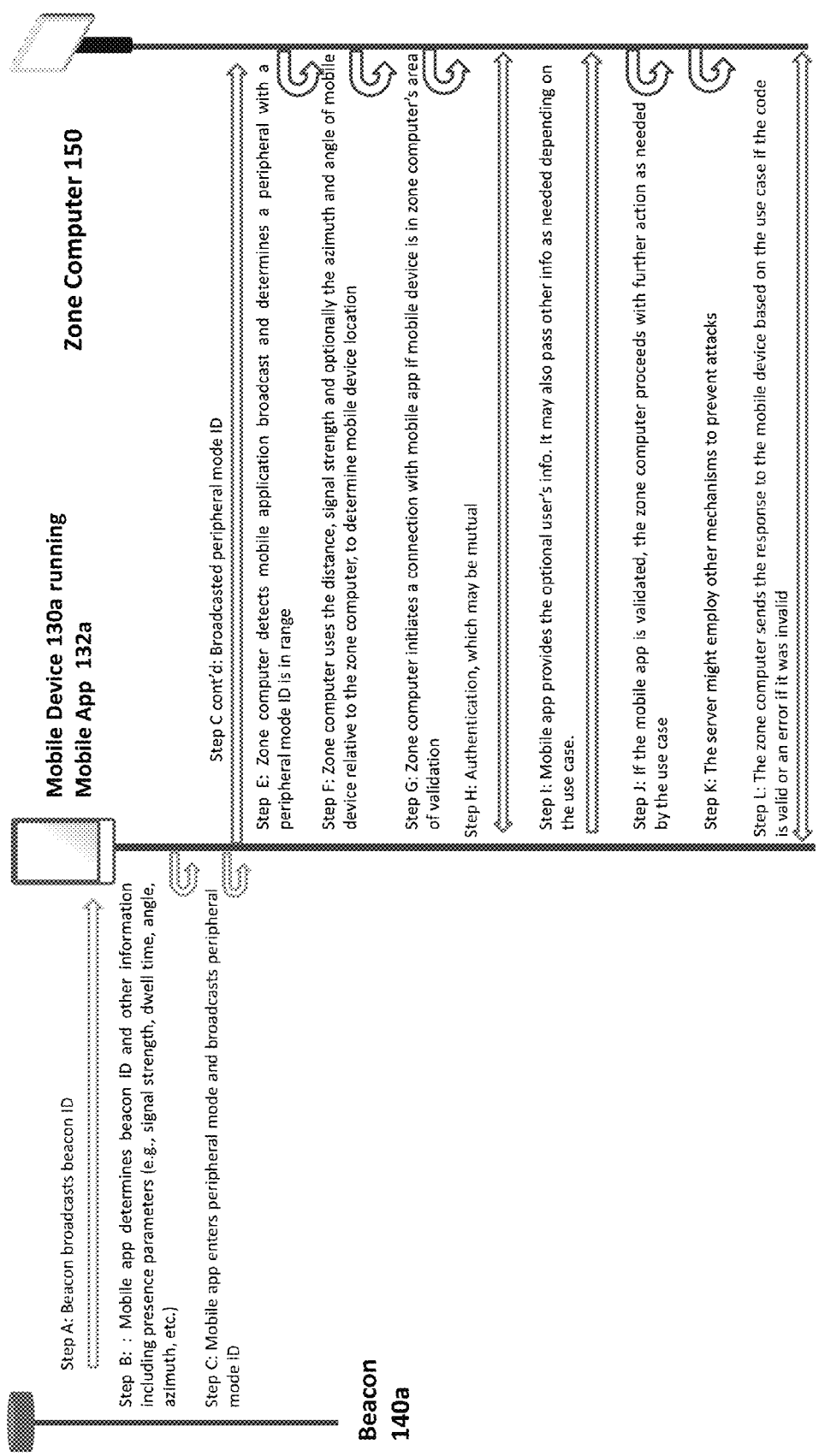
FIG. 7 illustrates a data flow diagram of yet another embodiment of a secure beacon-based system.

FIG. 7 illustrates a data flow diagram of yet another embodiment of the secure beacon-based system. This embodiment is similar to the embodiments shown in FIGS. 5 and 6 which uses the zone computer 150, except the servers 152 may not be used. Similar to FIGS. 5 and 6, in the embodiment described with respect to FIG. 7, the mobile device 130a receives a beacon ID and enters into a peripheral mode, and the zone computer is for example a BLE-enabled device that can detect the mobile device 130a in peripheral mode and connect with the mobile application 132a. However, instead of sending a single-use code, the zone computer can validate the mobile application 132a and send the rewards, coupons, etc., to the mobile application 132a so the mobile application 132a does not need to connect to the application server 152a. If needed, the zone computer 150 may connect to the application server 152a to download rewards, coupons, etc., but the application server 152a is not necessarily needed.

As shown in FIG. 7, step A-C are the same as in FIG. 6. These steps are performed and the mobile device 130a enters peripheral mode. In peripheral mode, the mobile application 132a broadcasts a peripheral mode ID to announce its presence to nearby devices, for example, via a BLE interface or other short-distance interface.

Steps E-H are also the same as shown in FIG. 5. For example, the zone computer 150 detects the broadcasted peripheral mode ID; determines whether the mobile device 130a is in an area of validation of the zone computer 150a and then proceeds to authentication at step H.

At step I, the mobile application 132a sends user credentials, beacon ID, or any other information the zone computer needs to validate the mobile application 132a. In one example, the peripheral mode ID sent by the mobile application 132a at step C is dynamically calculated similar to the beacon ID described with respect to FIG. 3. The zone computer 150 locally calculates the peripheral ID and compares the received peripheral ID and the locally computer peripheral ID to determine whether they match. If they match, the mobile application is validated.

If the mobile application 132a is validated, then at step J, actions are performed, such as sending rewards, coupons, etc., to the mobile application 132a; otherwise, the received code is ignored. At step K, the zone computer 150 may employ techniques to prevent attacks. At step L, the zone computer 150 sends a response to the mobile application 132a. The response may include services or information for the request if the mobile application 132a was validated or an indication that the request was denied.

In various embodiments described above, the beacon itself can also act as a zone computer. For example, when the mobile application detects a beacon, it connects to it, and the beacon returns a unique single use code, which is then used for further communication with the application server. Also, a plurality of beacons can be used, instead of a single beacon. For example, the information from a plurality of beacons is used to derive a peripheral ID for connection with the zone computer.

In many instances above, the zone computer 150 or the application server 152a is described by way of example as sending rewards, coupons or other information to the mobile application 132a in response to validating the mobile application 132a. The systems described herein may be used in many other environments to invoke other types of actions in response to validation of the mobile application, which may include validating that the mobile device is near a beacon of the system. For example, the system may be used to grant or deny access to a geographic area. For example, for a subway, users often enter through gated lanes to enter the subway station. If the mobile application is validated, the action invoked by the application server or the zone computer may include opening the gate. In another example, parking lots are often gated and the validation may be used to open a gate for a parking lot. In another example, validation may be performed to unlock a door to a restricted room or building. Many other actions may be invoked that are related to the location of the beacon and user if validated.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A secure beacon-based system comprising:
a plurality of beacons, wherein each beacon of the plurality of beacons, is located in a sub-location of a geographic area, and
each beacon includes hardware comprising dynamic beacon identifier (ID) generation logic, a data storage, and a short-distance transmitter,
wherein the dynamic beacon ID generation logic generates a beacon ID based on information in the data storage, and at least a portion of the beacon ID is dynamic and is varied at intervals or at least a portion of a payload of a beacon message is dynamic and is varied at intervals, and the short-distance transmitter periodically transmits the beacon ID,
wherein the dynamic beacon ID generation logic generates the dynamic portion of the beacon ID or the dynamic payload based on at least one beacon ID calculation function, and an application server stores the at least one beacon ID calculation function to locally compute the dynamic portion of the beacon ID or the dynamic payload, and
wherein each beacon determines input parameters for the at least one beacon ID calculation function, and at least one of the input parameters is a variable input parameter that varies per interval causing an output of the at least one beacon ID calculation function to vary per interval, and the application server determines the same input parameters to locally compute an output of the at least one beacon ID calculation function; and
a mobile application executed by a mobile device, wherein the mobile application receives the beacon ID of a beacon of the plurality of beacons via a short-distance communication interface of the mobile device, and
the mobile application:
determines presence parameters associated with presence of the mobile device at the sub-location of the beacon;
determines whether to send a request to the application server based on the presence parameters;
in response to determining to send the request, generates the request, wherein the request includes the beacon ID comprising at least the dynamic portion; and
sends the request via a network interface of the mobile device to the application server,
wherein the application server receives the request via a network, locally computes the beacon ID comprising at least the dynamic portion based on the at least one beacon ID calculation function, compares the beacon ID from the request with the locally computed beacon ID, and determines whether the mobile device is located near the beacon based on the comparison.

2. The secure beacon-based system of claim 1, wherein the input parameters comprise at least a plurality of date, time, beacon location, beacon sub-location, beacon specific key, vendor specific key, government assigned geographic information, and beacon hardware specific information.

3. The secure beacon-based system of claim 1, wherein the variable input parameter comprises time or a periodically generated code that varies per interval.

4. The secure beacon-based system of claim 1, wherein the at least one beacon ID calculation function comprises a plurality of beacon ID calculation functions, and the beacon ID calculation functions are logically connected in a serial sequence, wherein an output of one of the beacon ID calculation functions is an input to another one of the beacon ID calculation functions.

5. The secure beacon-based system of claim 4, wherein the serial serial sequence of the logically connected beacon ID calculation functions is varied to vary the beacon ID per interval.

6. The secure beacon-based system of claim 1, wherein to compare the beacon ID from the request with the locally computed beacon ID, the application server determines whether the beacon ID from the request matches the locally computed beacon ID.

7. The secure beacon-based system of claim 6, wherein the application server sends information to the mobile application related to the beacon via the network if the beacon ID from the request matches the locally computed beacon ID; and
the application server ignores the request if the beacon ID from the request does not match the locally computed beacon ID.

8. The secure beacon-based system of claim 1, wherein the data storage of the beacon comprises a secure storage, and information unique to the beacon or unique to a group of the beacons is stored in the secure storage and is retrieved by the dynamic beacon ID generation logic to calculate the beacon ID.

9. A method for mobile application validation, the method comprising:
receiving, at an application server, a request from a mobile application, wherein the request is associated with a beacon and includes a dynamic beacon ID or a dynamic payload of a message received, from the beacon, by a mobile device hosting the mobile application, and
wherein the dynamic beacon ID or the dynamic payload is calculated based on at least one beacon ID calculation function, and the beacon determines input parameters for the at least one beacon ID calculation function, and at least one of the input parameters is a variable input parameter that varies per interval causing an output of the at least one beacon ID calculation function to vary per interval;
in response to receiving the request, computing, by a processor at the application server, a locally computed beacon ID or payload, wherein the computing at the application server the locally computed beacon ID or payload comprises:
storing the at least one beacon ID calculation function at the application server;
determining the same input parameters used to calculate the dynamic beacon ID or a dynamic payload in the request;
computing, by the processor of the application server, the locally computed beacon ID or payload based on the stored at least one beacon ID calculation function and the same input parameters;
comparing the locally computed beacon ID or payload with the received dynamic beacon ID or payload;
determining whether the request from the mobile application is validated based on the comparing;
responding to the request with information associated with the location of the beacon if validated; and
ignoring the request if not validated.

10. The method of claim 9, wherein determining whether the request from the mobile application is validated comprises:

determining whether the locally computed beacon ID or payload matches the dynamic beacon ID or payload.

11. The method of claim 9, wherein the mobile device is determined to be at a sub-location of the beacon if the locally computed beacon ID or payload matches the dynamic beacon ID or payload.

12. A secure beacon-based system comprising:
a plurality of beacons, wherein each beacon of the plurality of beacons is located in a sub-location of a geographic area, and each beacon periodically broadcasts a beacon ID via a short-distance transmitter;
a mobile application executed by a mobile device, wherein the mobile application: receives the beacon ID of a beacon of the plurality of beacons via a short-distance communication interface of the mobile device;
determines presence parameters associated with presence at the sub-location of the beacon; determines whether to enter a peripheral mode based on the presence parameters; and in response to determining to enter the peripheral mode, broadcasts a peripheral mode signal announcing the presence of the mobile application,
wherein the peripheral mode signal includes a peripheral mode ID, and at least a portion of the peripheral mode ID is dynamic and is varied at intervals, wherein the mobile application generates the peripheral mode ID based on at least one calculation function, wherein the mobile application determines input parameters for the at least one calculation function, and wherein at least one of the input parameters is a variable input parameter that varies per interval causing an output of the at least one calculation function to vary per interval; and
a zone computer located in the geographic location of the plurality of beacons, wherein the zone computer:
receives the peripheral mode signal, that includes the peripheral mode ID;
determines whether the mobile device is in an area of validation of the zone computer;
in response to determining the mobile device is in the area of validation, sends a message to the mobile application to authenticate the mobile application,
wherein to send the message to the mobile application to authenticate the mobile application, the zone computer:
stores the at least one calculation function;
determines the same input parameters used to calculate the peripheral mode ID at the mobile application;
computes, by a processor, a locally computed peripheral mode ID based on the stored at least one calculation function and the same input parameters;
compares the received peripheral mode ID with the locally computed peripheral mode ID to invoke authentication of the mobile application; and
in response to the authentication of the mobile application, sends a single-use code to the mobile application, wherein the single-use code is calculated according to a code generation function;
wherein the mobile application receives the code from the zone computer via the short-distance communication interface of the mobile device and sends a request, including the single-use code and the beacon ID, to an application server via a network interface of the mobile device, and wherein the application server:
receives the request via a network;
generates a locally computed single-use code according to the code generation function;
compares the locally computed single-use code with the single-use code in the request to validate the request from the mobile application;
if validated, sends information to the mobile application via the network in response to the request; and
if not validated, ignores the request.

13. The secure beacon-based system of claim 12, wherein to compare the locally computed single-use code with the single-use code in the request, the application server determines whether the single-use code from the request matches the locally computed single-use code.

14. The secure beacon-based system of claim 12, wherein to validate the mobile application, the application server determines whether the code in the request is related to the beacon ID in the request.

15. The secure beacon-based system of claim 12, wherein the zone computer ignores the authentication of the mobile application if the received peripheral mode ID does not match the locally computed peripheral mode ID.

16. A secure beacon-based system comprising:
a plurality of beacons, wherein each beacon of the plurality of beacons is located in a sub-location of a geographic area, and each beacon periodically broadcasts a beacon ID via a short-distance transmitter;
a mobile application executed by a mobile device, wherein the mobile application receives the beacon ID of a beacon of the plurality of beacons via a short-distance communication interface of the mobile device,
wherein the mobile application:
determines presence parameters associated with presence at the sub-location of the beacon;
determines whether to enter a peripheral mode based on the presence parameters;
in response to determining to enter the peripheral mode, broadcasts a peripheral mode signal including at least one of service or characteristic of the mobile application, the peripheral mode signal including a peripheral mode ID, and wherein at least a portion of the peripheral mode ID is dynamic and is varied at intervals;
generates the peripheral mode ID based on at least one calculation function;
determines input parameters for the at least one calculation function, wherein at least one of the input parameters is a variable input parameter that varies per interval causing an output of the at least one calculation function to vary per interval; and
a zone computer located in the geographic location of the plurality of beacons, wherein the zone computer:
receives the peripheral mode signal including the peripheral mode ID;
determines whether the mobile device is in an area of validation of the zone computer; and
in response to determining the mobile device is in the area of validation, sends a message to the mobile application to authenticate the mobile application,
wherein to send the message to the mobile application to authenticate the mobile application, the zone computer:
stores the at least one calculation function;
determines the same input parameters used to calculate the peripheral mode ID at the mobile application;

computes, by a processor, a locally computed peripheral mode ID based on the stored at least one calculation function and the same input parameters;

compares the received peripheral mode ID with a locally computed peripheral mode ID to invoke authentication of the mobile application; and in response to the authentication of the mobile application, sends information to the mobile application, wherein the information is associated with the mobile device being at a location of the beacon.

17. The secure beacon-based system of claim 16, wherein at least one of the plurality of beacons is incorporated in the zone computer.

* * * * *

UNITED STATES PATENT AND TRADEMARK OFFICE
CERTIFICATE OF CORRECTION

PATENT NO. : 9,608,999 B2  Page 1 of 1
APPLICATION NO. : 14/557551
DATED : March 28, 2017
INVENTOR(S) : Avishek Somani et al.

It is certified that error appears in the above-identified patent and that said Letters Patent is hereby corrected as shown below:

In Column 14, Line 5, Claim 5, "serial serial" should read "serial".

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*